Oct. 30, 1923.

C. K. EDWARDS 1,472,358

CONTROL GEAR FOR ELECTRIC DRIVING MECHANISM

Filed June 1, 1922

INVENTOR.
Charles Hearne Edwards

Patented Oct. 30, 1923.

1,472,358

UNITED STATES PATENT OFFICE.

CHARLES KEARNS EDWARDS, OF CHINGFORD, LONDON, ENGLAND, ASSIGNOR TO THE ASSOCIATED EQUIPMENT COMPANY LIMITED, OF WESTMINSTER, LONDON, ENGLAND, A BRITISH COMPANY.

CONTROL GEAR FOR ELECTRIC DRIVING MECHANISM.

Application filed June 1, 1922. Serial No. 565,192.

*To all whom it may concern:*

Be it known that I, CHARLES KEARNS EDWARDS, a subject of the King of England, residing at Chingford, London, England, have invented certain new and useful Improvements in Control Gears for Electric Driving Mechanism, of which the following is a specification.

This invention is for improvements in or relating to control gear for electric driving mechanism. The invention is particularly applicable to control gear on electrically driven vehicles which take their current by means of a trolley from an overhead wire, but it is to be understood that the invention is not limited to this particular use. The invention has for one of its objects to provide a construction whereby the driver shall have the mechanism under full control and still have his hands free for steering or performing other manipulations. Another object of the invention is to guard against accidents due to illness of the driver or damage to the mechanism.

The primary feature of the present invention consists in the provision in control gear for electric driving mechanism of a foot-lever spring controlled so that it tends to move in one direction about its pivot and having pedals on both sides of its pivot whereby it may be positively moved in both directions about the latter. Thus, for instance, the spring may tend to return the lever to neutral or zero position in which no drive is imparted to the mechanism, but should the spring break the driver can still positively return the lever to that position.

Conveniently the foot-lever moves in one direction to effect forward running of the driving mechanism and in the other direction to effect reversing of the driving mechanism, and a manually withdrawable stop is provided which normally prevents movement of the foot-lever into reversing position. The stop may take the form of a lever moving between abutments, certain of which are so arranged that they can be withdrawn to permit of reversing.

Other features of the invention relate to the construction, arrangement and means of manipulating the aforesaid abutments and to other details in connection with the control and operation of the driver's foot-lever.

For a more complete understanding of the invention there will now be described, by way of example only and with reference to the accompanying drawings, one constructional form of mechanism according to the invention. It is to be understood, however, that the invention is not limited to the precise constructional details set forth.

In these drawings:—

Figure 1:
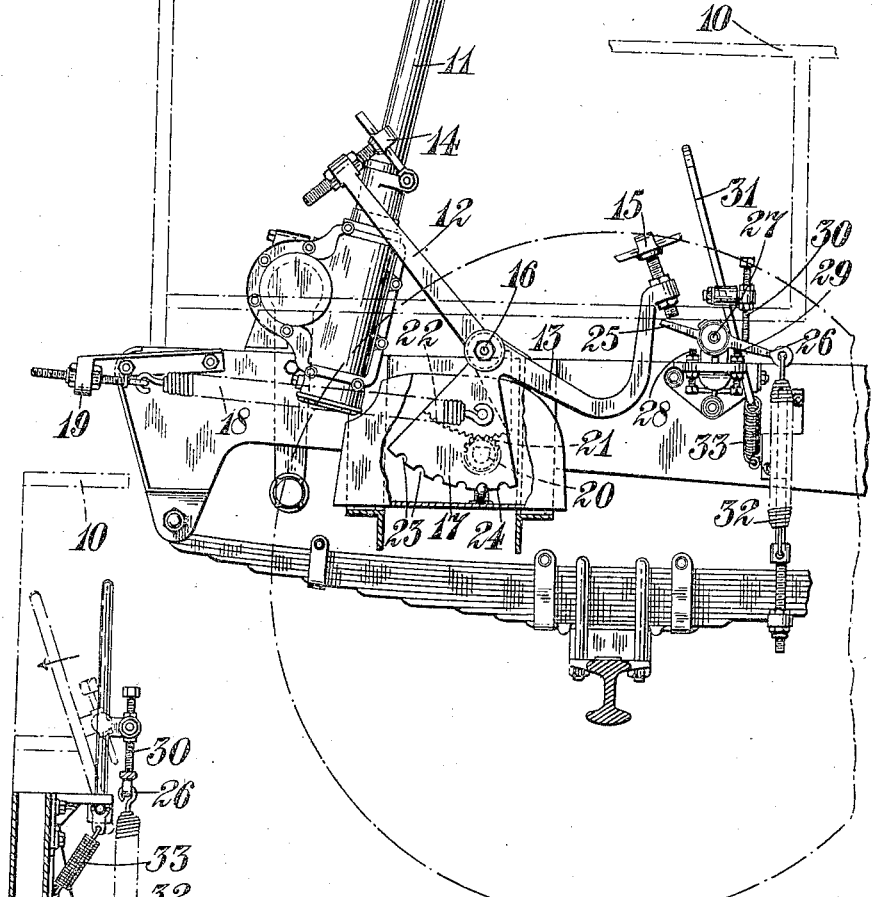
Figure 2:
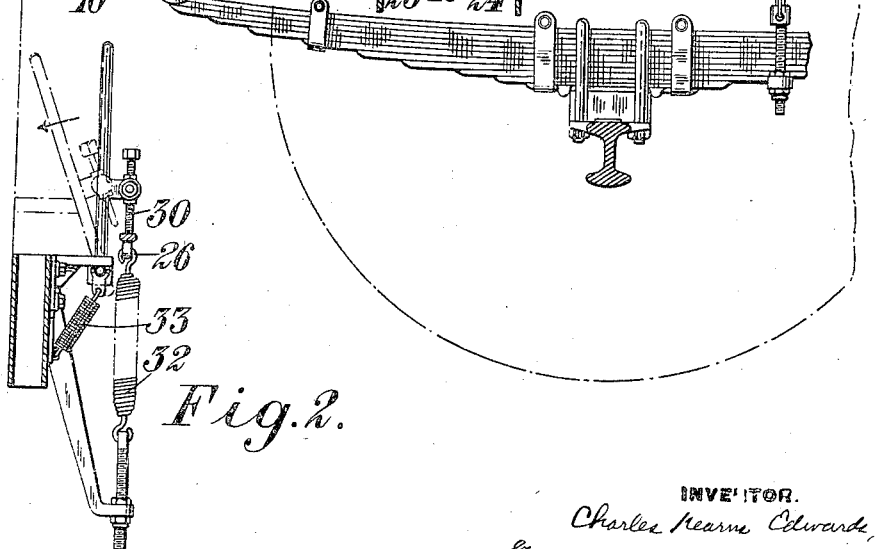

Figure 1 is a side elevation of a portion of the mechanism, parts being broken away for the sake of clearness and the position of other parts being shown in chain lines, and Figure 2 is an end elevation of certain of the parts shown in Figure 1.

Like reference numerals indicate like parts throughout the drawings.

In the construction illustrated, the position of the driver's seat on a trolley omnibus is indicated at 10 and the steering column at 11. Near the base of the latter is the driver's foot-lever having arms 12 and 13. By manipulating this lever 12, 13 the driver controls the electric driving mechanism of the vehicle. The arms 12, 13 carry adjustable pedals 14 and 15 respectively, whereof the former is intended to be used during forward driving of the vehicle. The pedal 14 is pressed down for forward driving and the pedal 15 for reversing so that the lever can be positively moved in both directions about its pivot which is indicated at 16. The lever 12, 13 carries a sector 17 to which is attached one end of a spring 18, the other end of which is adjustably anchored to a suitable lug 19 on the vehicle frame. The tendency of the spring 18 is to move the foot-lever in the same direction as that in which it is moved when the pedal 15 is pressed down. It is a feature of the invention to arrange that the spring 18 shall be so positioned that as its tension increases due to pedal 14 being pressed down, its operative leverage about the pivot 16 is decreased. That is to say, that as the pedal 14 is pressed more and more down, the end of the spring 18 which is connected to the sector 17 will, as it swings about the pivot 16, have its operative distance from the pivot decreased in order to lessen its turning effort as its strength increases. In this manner the pressure to be applied by the driver upon the pedal 14 will be maintained substantially constant during all speeds.

The lever 12, 13 preferably controls the driving mechanism through a shaft 20 carrying a gear wheel 21 which meshes with a toothed sector 22 moving with the lever 12, 13. There will usually be several different forward speeds, and if desired there may also be several different reverse speeds, and contact members are provided upon the shaft 20, one for each speed forward or reverse. The sector 17 has at its periphery a series of recesses 23 with which there co-operates a spring-pressed roller or ball 24. The member 24 registers the lever 12, 13 in one or another of a number of selected positions which correspond to the arrangement of the contact members on the shaft 20. The parts are shown in Figure 1 in the neutral or zero position in which no drive is imparted to the mechanism. When the pedal 14 has been pressed down, the spring 18 tends to return the lever 12, 13 to this neutral position, but should the spring break the driver can still positively return the lever to that position by pressing upon the pedal 15.

The foot-lever 12, 13 is provided with a manually-withdrawable stop which normally prevents movement of the foot-lever into reversing position by arresting it in the aforesaid neutral or zero position. In the construction illustrated this stop takes the form of a lever having arms 25 and 26 whereof the former projects into the path of the stem of the pedal 15. The lever 25, 26 is pivoted at 27 and moves between abutments certain of which are so arranged that they can be withdrawn to permit of reversing. On both sides of the pivot 27 there are adjustable lower abutments 28, 29, and opposite the abutment 29 there is also an adjustable upper abutment 30. The latter is carried upon a manually operated lever 31 and can be swung into and out of operative position above the arm 26 of the stop-lever. The lever 31 is preferably situated out of the way beneath the seat 10. The stop-lever 25, 26 is controlled by a spring 32 which tends to maintain the stop-lever in the same position as that in which the withdrawable abutment 30 maintains it, and the lever 31 is controlled by a spring 33 which tends to maintain the lever with the abutment 30 in operative position over the stop-lever arm 26. In Figure 2 there is shown in chain lines the position to which the lever 31 is brought when the abutment 30 is rendered inoperative.

In operation it will be seen that when the abutment 30 is in operative position, it maintains the stop-lever 25, 26 with its arm 26 in contact with the abutment 29. The arm 25 of the stop-lever projects into the path of the foot lever 12, 13 and when the abutment 30 is in operative position, the arm 25 constitutes a stop against which the spring 18 tends to bring the foot-lever 12, 13. When these parts are in engagement the aforesaid neutral or zero position is established. The abutment 28 is so situated that when the abutment 30 has been withdrawn, the driver can, by pressing upon the pedal 15, move the foot-lever somewhat beyond the neutral position into the reversing position of the mechanism. In doing this he moves the arm 25 into engagement with the abutment 28 and applies tension to the spring 32. The springs 18 and 32 act in opposition but the former is arranged to be weaker than the latter so that the latter will cause the return of the foot-lever into neutral position should the driver move his foot from the foot-lever. Thus, it will be seen that the levers, abutments and springs are so arranged relatively to each other that the constant tendency of the springs is to return the foot-lever to a predetermined zero position. Moreover, the construction of mechanism requires but little operation by the driver's hands, which is a distinct advantage On a trolley omnibus the foot-lever and its co-operating mechanism may conveniently be mounted at the foot of the steering column, but it will be clear that any suitable situation may be chosen for the mechanism according to circumstances. It is also to be understood that the invention is not limited to the precise constructional details hereinbefore set forth.

I claim:

1. In control gear for the driving mechanism of a motor-driven vehicle, the combination with a support, of a foot-lever fulcrumed thereon and having pedals, one at each side of its fulcrum, so arranged that the lever can be positively rocked in both directions about its fulcrum through a neutral position into each of two end positions, and a spring tending to rock the said lever into one of its end positions.

2. In control gear for electric driving mechanism, a foot-lever, a support in which it is pivoted, pedals on said foot-lever on both sides of its pivot whereby it can be positively moved in one direction to effect forward running of the driving mechanism and in the other direction to effect reversing of the driving mechanism, resilient means tending to move the said lever into reversing position, and a manually-withdrawable stop for normally preventing movement of the foot-lever into such position.

3. In control gear for electric driving mechanism, a foot-lever, a support in which it is pivoted, pedals on said foot-lever on both sides of its pivot whereby it can be positively moved in one direction to effect forward running of the driving mechanism and in the other direction to effect reversing of the driving mechanism, resilient means tending to move the said lever into reversing position, a stop-lever, a support in which it is pivoted so that one end of the stop-lever projects into the path of the foot-lever, and abutments controlling the movement of the stop-lever normally to prevent movement of the foot-lever into reversing position.

4. In control gear for electric driving mechanism, a foot-lever, a support in which it is pivoted, pedals on said foot-lever on both sides of its pivot whereby it can be positively moved in one direction to effect forward running of the driving mechanism and in the other direction to effect reversing of the driving mechanism, resilient means tending to move the said lever into reversing position, a stop lever, a support in which it is pivoted so that one end of the stop-lever projects into the path of the foot-lever, and a manually-withdrawable abutment controlling the movement of the stop-lever and arranged to be withdrawn to permit movement of the foot-lever into reversing position.

5. In control gear for electric driving mechanism, a foot-lever, a support in which it is pivoted, pedals on said foot-lever on both sides of its pivot whereby it can be positively moved in one direction to effect forward running of the driving mechanism and in the other direction to effect reversing of the driving mechanism, resilient means tending to move the said lever into reversing position, a stop-lever, a support in which it is pivoted so that one end of the stop-lever projects into the path of the foot-lever, abutments controlling the movement of the stop-lever normally to prevent movement of the foot-lever into reversing position, and resilient means controlling the stop-lever, which resilient means, when the two said levers are in engagement with each other, act in opposition to the resilient means controlling the foot-lever, which latter are weaker than the resilient means for the stop-lever, for the purpose specified.

6. In control gear for electric driving mechanism, a foot-lever, a support in which it is pivoted, pedals on said foot-lever on both sides of its pivot, whereby it can be positively moved in one direction to effect forward running of the driving mechanism and in the other direction to effect reversing of the driving mechanism, a spring tending to move the said lever into reversing position, a stop-lever, a support in which it is pivoted so that one end of the stop-lever projects into the path of the foot-lever, abutments controlling the movement of the stop-lever normally to prevent movement of the foot-lever beyond the zero position, certain of said abutments being manually-withdrawable to permit movement of the foot lever into reversing position, and a spring controlling the stop-lever, which spring, when the two said levers are in engagement with each other, acts in opposition to the spring controlling the foot-lever which latter is weaker than the spring for the stop-lever, the constant tendency of the springs being to return the foot-lever to the said zero position, for the purpose specified.

7. In control gear for electric driving mechanism, a foot-lever, a support in which it is pivoted, pedals on said foot-lever on both sides of its pivot, whereby it can be positively moved in one direction to effect forward running of the driving mechanism and in the other direction to effect reversing of the driving mechanism, a spring tending to move the said lever into reversing position, a stop-lever, a support in which it is pivoted so that one end of the stop-lever projects into the path of the foot-lever, abutments controlling the movement of the stop-lever normally to arrest the foot-lever, when it is moved towards reversing position, in a position in which the electric driving mechanism is inoperative, certain of said abutments being manually-withdrawable to permit movement of the foot-lever into reversing position, and a spring controlling the stop-lever, which spring, when the two said levers are in engagement with each other, acts in opposition to the spring controlling the foot-lever which latter is weaker than the spring for the stop-lever, the constant tendency of the springs being to return the foot-lever to the said position in which the electric driving mechanism is inoperative, for the purpose specified.

8. In control gear for electric driving mechanism, a foot-lever, a support in which it is pivoted, pedals on said foot-lever on both sides of its pivot whereby it can be positively moved in both directions about the latter, a spring tending to move the said lever in one direction about its pivot, means for anchoring said spring at one end to a stationary support, and means for anchoring the other end of said spring to the lever, the anchorage positions being so chosen that as the tension of the spring increases due to rotation of the lever, its operative leverage about the pivot of the lever is decreased, for the purpose specified.

9. In control gear for electric driving mechanism, a foot-lever, a support in which it is pivoted, pedals on said foot-lever on both sides of its pivot whereby it can be positively moved in both directions about the latter, resilient means intended to move the said lever in one direction about its pivot, and a registering mechanism to tend to retain the lever in one or another of a number of selected positions, for the purpose specified.

10. In control gear for electric driving mechanism, a foot-lever, a support in which it is pivoted, pedals on said foot-lever on both sides of its pivot whereby it can be positively moved in both directions about the latter, resilient means intended to move the said lever in one direction about its pivot, and a spring-pressed locking mechanism arranged to cooperate with a series of recesses situated in the path of movement of part of said lever, to register the lever in one or another of a number of selected positions, for the purpose specified.

11. In control gear for the driving mechanism of a motor-driven vehicle, the combination with a support, of a foot-lever fulcrumed thereon and having pedals one at each side of its fulcrum so arranged that the lever can be positively rocked about its fulcrum through a neutral position into one end position for forward running of the driving mechanism and into a second end position for reverse running, and a spring tending to move said lever into said second end position.

12. In control gear for the driving mechanism of a motor-driven vehicle, the combination with a support, a foot-lever fulcrumed thereon, and a spring tending to rock the lever into one end position, of a stop-lever so fulcrumed on said support that a part of the lever projects into the path of the foot-lever, and abutments for limiting the movement of said stop-lever in both directions.

13. In control gear for the driving mechanism of a motor-driven vehicle, the combination with a support, a foot-lever fulcrumed thereon, and a spring tending to rock the lever into one end position, of a double-ended stop-lever so fulcrumed on said support that one of its ends projects into the path of the foot-lever, and abutments, allotted one to each end of the said stop-lever, for limiting the movement of the latter in both directions.

14. In control gear for the driving mechanism of a motor-driven vehicle, the combination with a support, a foot-lever fulcrumed thereon, and a spring tending to rock the lever into one end position, of a spring-controlled double-ended stop-lever so fulcrumed on said support that one of its ends projects into the path of the foot-lever, two abutments arranged to coact each with one end of the stop-lever for limiting its movement in both directions, and a third abutment movable into and out of the path of one end of the stop-lever and adapted to hold that end in its end position on one of said two abutments.

In testimony whereof I have signed my name to this specification in the presence of two subscribing witnesses.

CHARLES KEARNS EDWARDS.

Witnesses:
 DUDLEY EUGENE BATTY,
 LEONARD TOWERS.